United States Patent [19]
Belknap

[11] Patent Number: 5,265,521
[45] Date of Patent: Nov. 30, 1993

[54] TOAST SHADE SELECTOR

[75] Inventor: Lee J. Belknap, Glen Allen, Va.

[73] Assignee: Hamilton Beach/Procter-Silex, Inc., Glen Allen, Va.

[21] Appl. No.: 968,981

[22] Filed: Oct. 30, 1992

[51] Int. Cl.[5] ............................................. A47J 37/08
[52] U.S. Cl. ................................. 99/327; 99/329 R; 99/335; 99/389; 99/385; 219/489; 219/492; 219/510; 337/77; 337/104
[58] Field of Search .............. 99/326-329 R, 99/329 P, 329 RT, 331, 332, 334, 335, 385, 389, 391; 219/492, 489, 493, 500, 501, 506, 510, 511; 337/77, 103, 104

[56] References Cited

U.S. PATENT DOCUMENTS

| | | | |
|---|---|---|---|
| 2,167,121 | 7/1939 | McCreary et al. | 99/329 R |
| 2,179,811 | 11/1939 | Brosseau | 219/510 X |
| 2,537,408 | 1/1951 | Hansen | 99/329 R |
| 2,724,322 | 11/1955 | Parr | 99/327 |
| 2,786,990 | 3/1957 | Garner | 219/489 |
| 2,830,164 | 4/1958 | Weber et al. | 219/489 |
| 2,838,645 | 6/1958 | Welch | 219/492 |
| 2,920,551 | 1/1960 | Schmall | 99/329 P |
| 2,969,010 | 1/1961 | Andrews et al. | 99/329 R |
| 3,575,102 | 4/1971 | Parr | 99/328 |
| 3,873,955 | 3/1975 | Bauer | 337/77 |

FOREIGN PATENT DOCUMENTS 649005  1/1951  United Kingdom ................ 99/327

Primary Examiner—Timothy F. Simone
Attorney, Agent, or Firm—Roger S. Dybvig

[57] ABSTRACT

A toast shade selector includes a rotatable shaft interposed between aligned openings in upstanding plates of a mounting bracket. A cam on the shaft is rotated in the clockwise or counter-clockwise direction to regulate the toasting time intervals. A spring carried by the shaft biases the cam against an adjusting nut and also biases a portion of the shaft into one of the openings. Both the shaft and the cam are made from sheet metal.

10 Claims, 3 Drawing Sheets

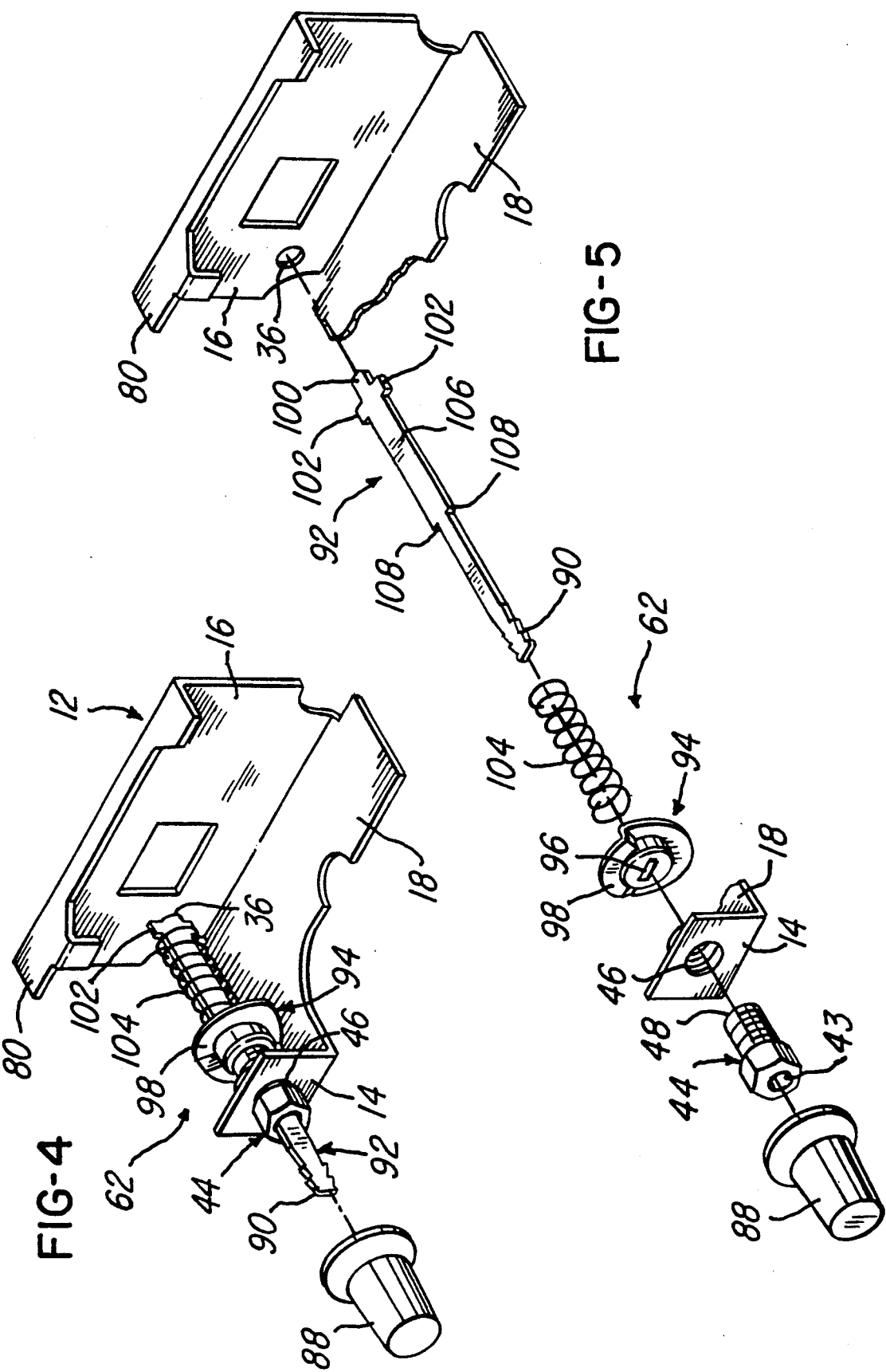

5,265,521

TOAST SHADE SELECTOR

FIELD OF THE INVENTION

This invention relates to a toast shade selector for use in conjunction with a toasting time control and more particularly to an improved toast shade selector which is durable, dependable and inexpensive to manufacture and assemble.

BACKGROUND OF THE INVENTION

A conventional type of household electric toaster has a bread carriage that, during a toasting cycle, is held down by a releasable latch mechanism. The toasting time and the release of the bread carriage is controlled by a bimetallic element or "bimetal". The extent by which the bimetal must deflect in order to release the bread carriage is a function of the heating time and, accordingly, the degree, or shade, to which a piece of bread is toasted. The extent of bimetal deflection required to release the latch mechanism is controlled by a toast shade selector that includes a shade control knob accessible to the user. When a darker shade of toast is desired, the shade control knob is rotated so that the bimetal must deflect to a greater degree before releasing the latch mechanism which permits the bread carriage to move upwardly from its toasting position to its non-toasting position. Conversely, when a lighter shade of toast is desired, the shade control knob is rotated so that the bimetal deflects to a smaller degree before the toast carriage moves from its toasting position to its non-toasting position.

FIGS. 1 and 2 illustrate a prior art shade selector 10 having an upstanding, metal mounting bracket 12 with spaced apart plates 14 and 16 which are generally parallel to one another and interconnected at their lower ends by a base plate 18. The toast shade setting is adjusted by turning a shade control knob 20 which is frictionally secured to the outer or knob end 22 of a substantially D-shaped shade control shaft or D-shaft 24 upon which a molded plastic shade control cam element 26 is mounted for relative axial movement. Cam element 26 has a D-shaped throughbore that cooperates with the D-shaft 24 to prevent relative rotation between them. In addition cam element 26 has an outwardly facing cam surface 28 adapted to bear against a spring-biased latch plate 30 (FIG. 3) of a bread toaster 32. As is well known, shade control knob 20 is disposed on the outer end 22 of shaft 24 to enable one to turn the shade control cam element 26 in both clockwise and counter-clockwise directions to adjust the toasting times.

The inner end, designated 34, of the shade control shaft 24 is of a reduced diameter and is journaled in, and projects through, an aperture 36 in the inner plate 16. The reduction in diameter creates an inwardly facing shoulder 38 that bears against the outwardly facing surface of the inner plate 16. A spring clip 40 that bears against the opposite, or inwardly facing surface, of the inner plate 16 is seated in a groove 42 at the extreme inner end of the D-shaft 24. Accordingly, the D-shaft 24 is held axially fixed to the inner plate 16 and will not be accidentally dislodged if one pulls the knob 20 off from the D-shaft 24.

The knob end 22 of the D-shaft 24 is journaled in a throughbore 43 of a hollow adjusting nut 44 which is threadedly mounted in a bore 46 in the outer plate 14. The shade control cam element 26 is pressed against the inner end face 48 of the adjusting nut 44 by a compression spring 50 coiled about the D-shaft 24. The inner end of the spring 50 bears under compression against the inner plate 16 and is thereby frictionally resisted from rotating. A washer 52 is freely rotatably disposed around the D-shaft 24 between the cam element 26 and the spring 50 to permit the cam element 26 to rotate relative to the spring 50 without having the outer end of the spring 50 abrade against the cam element 26 during rotation. In practice, the adjusting nut 44 is rotated by use of a suitable tool (not shown) to position the cam element 26 along the D-shaft 24 so that the cam element 26 can effectively be rotated to vary the toasting time and thereby the toast shade over a useful interval. This adjustment of the cam element 26 is normally done at the factory which manufactures the toaster.

The prior art toast shade selector of FIGS. and 2 is dependably effective to control the shade of toast, is durable, and is relatively inexpensive to manufacture and assemble. However, its D-shaft 24 is a relatively complex part which is typically formed by screw machining procedures. Both the D-shaft 24 and the molded plastic cam element 26 are relatively expensive to manufacture. Due to the large numbers of toasters produced each year, there is always a need to decrease the manufacturing cost wherever possible. A small savings in the cost of manufacturing a single toaster can provide the manufacturer quite substantial savings over the course of a year.

SUMMARY OF THE INVENTION

An object of the present invention is to provide an improved toast shade selector which has the advantages of the prior art toast shade selectors but at a substantially reduced cost. Another object of this invention is to provide a toast shade selector which incorporates parts which are less expensive than parts of the prior art toast shade selectors, which has fewer parts than the prior toast shade selectors, and which is less expensive to assemble than prior toast shade selectors.

In accordance with this invention, a toast shade selector is provided which, although similar in appearance to and essentially identical in function with the prior art toast shade selector, can be manufactured and assembled at a significantly lower cost than prior art toast shade selectors. The selector of this invention includes a flat, stamped metal, shade control shaft and a stamped metal shade control cam element which has a slot that slidably receives the shade control shaft. A compression spring coiled about the shade control shaft is confined between the inwardly facing surface of the cam element and a pair of transversely extending projections formed o the shade control shaft adjacent its inner end. Accordingly, the compression spring presses the cam element outwardly into engagement with the adjusting nut and presses the transversely extending projections into engagement with the inner mounting plate. The compression spring rotates with the control shaft and the cam element and there is no need to provide for relative rotation between the compression spring and the cam element, as by use of a washer that separates the two parts.

To prevent accidental removal of the shade control shaft from the inner plate, the innermost portion of the control shaft beyond the transverse projections extends inwardly through and past the aperture in the inner mounting plate. Moreover, the control shaft has an intermediate section that is wider than the slot in the cam element that receives the control shaft. Shoulders formed at the outer end of the intermediate section are adapted to be stopped against the cam element to limit outward movement of the control shaft. Accordingly, if one were to pull outwardly on the shade control shaft, the shoulders will engage the cam element while the inner end of the shaft is still confined within the aperture in the inner plate.

The control shaft and the cam element of this invention, because each may be made in one piece by metal stamping operations, are less expensive to manufacture than the control shaft and the cam element of the prior art shade selectors. Furthermore, the shade selector of this invention is so constructed that the control shaft is inherently held in its operating position without the use of a spring clip or the like. And as mentioned above, the shade selector of this invention is made without a washer or other means to prevent relative rotation between the compression spring and the cam element. This invention, therefore, provides a savings in the cost of parts and the number of parts and also a savings in assembly costs due to the fewer number of parts and due to the simplicity with which the selector may be assembled.

The structure, operation, and other objects and advantages of the presently preferred embodiment of the invention will become further apparent upon consideration of the following description taken in conjunction with the accompanying drawings.

BRIEF DESCRIPTION OF THE DRAWINGS

FIG. 4 is a partly exploded perspective view of a toast shade selector incorporating the present invention; and FIG. 5 is an exploded, perspective view, with parts broken away, of the toast shade selector illustrated in FIG. 4.

DETAILED DESCRIPTION

Figure 3:
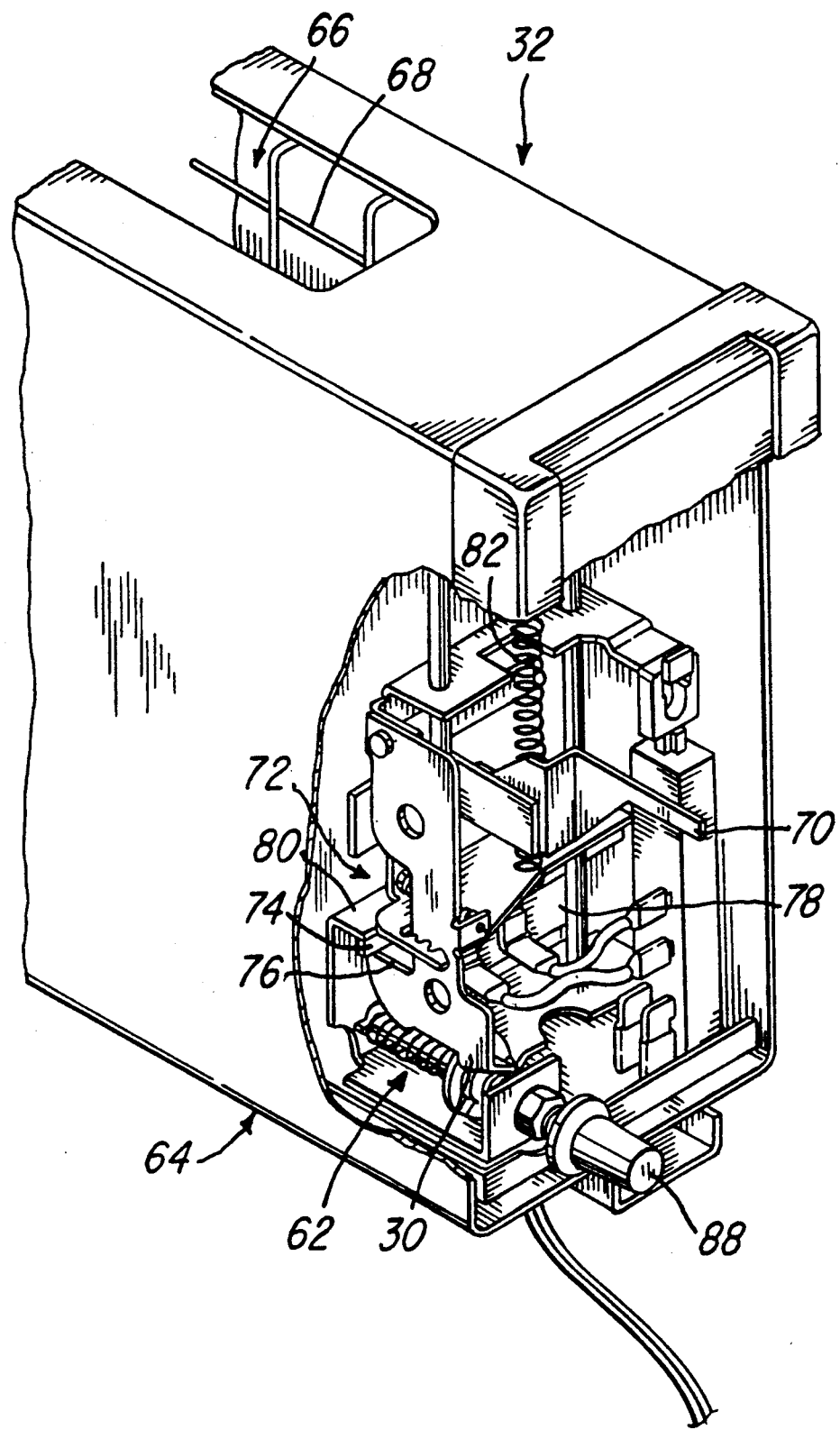
FIG. 3 is a fragmentary, perspective view of a toaster appliance embodying a toast shade selector in accordance with the teachings of the present invention.

Referring to FIG. 3, a toaster 32 for toasting bread or the like is illustrated that embodies a toast shade selector 62 in accordance with the teachings of the present invention. The details of construction of the toaster 32 form no part of this invention and the toaster is described only briefly herein.

The toaster 32 includes a housing 64 with a toasting chamber 66 and heating elements (not shown) supported in a known way across the sides of the toasting chamber 66 behind grill wires 68. Suitable electrical circuitry (not shown) controls the supply of electricity to the heating elements. To initiate a toasting operation, a bread carriage (not shown) mounted within toasting chamber 66 that supports one or more slices of bread is lowered by manually depressing a lever 70 which projects out of an end wall of the housing 64. This lowers the bread into the toasting chamber 66 and initiates the flow of current to the heating elements. When the bread carriage is fully lowered, it is held in its lowered position by a latch mechanism 72 that includes the aforementioned latch plate 30 and a bimetal 74.

The details of the latch mechanism 72 may be entirely conventional and are unimportant to an understanding of this invention and are, therefore, not described herein. It suffices for an understanding of the present invention that the latch plate 30 has an upwardly facing latch surface 76 which bears against the bimetal 74 during a first stage of a toasting cycle and against the underside of a stop plate 80 during a later stage of the toasting cycle. Stop plate 80 is integrally formed with the mounting bracket 12. As the toasting cycle progresses, the bimetal 74 is first heated by a bimetal heater 78 and progressively increasingly deflects inwardly, to the left as viewed in FIG. 3, until it deflects so far that it becomes completely disengaged from the latch surface 76. At this time the latch plate 30 is pulled upwardly along with the bread carriage by a lifting spring 82 through a short distance after which the latch surface 76 engages the underside of the stop plate 80 to temporarily prevent further upward movement of the bread carriage. Power to the bimetal heater 78 is interrupted and the bimetal 74 cools down and begins to return to the right as viewed in FIG. 3 to its original orientation and now pushes the lower end of the latch plate 30 to the right as viewed in FIG. 3, causing it to pivot in a counter clockwise direction until its latch surface 76 is disengaged from the stop plate 80. The carriage is then returned by the carriage lifting spring 82 to its upper, non-toasting position. The toast chamber heating elements are de-energized in timed relation to the upward movement of the bread carriage.

The mechanical purpose of a toast shade selector, such as selector 10 of the prior art or selector 62 of this invention, is to selectively determine the position of the latch plate 30 relative to the bimetal 74 when the bread carriage is lowered, and particularly the length of the latch surface 76 that the bimetal 74 must traverse during a toasting operation in order to move out of engagement with the latch surface 76.

Referring now to FIGS. 4 and 5, the improved toast shade selector 62 of this invention can include some of the same parts as the prior art toast shade selector 10, and these parts are referred to by the same reference numbers. Thus, the improved toast shade selector 62 includes a metal mounting bracket 12 with spaced apart plates 14 and 16 which are generally parallel to one another and interconnected at their lower ends by a base plate 18. The outer plate 14 has a threaded bore 46 that receives an adjusting nut 44 having a throughbore 43 and the inner plate 16 has an aperture 36 aligned with the throughbore 43.

The toast shade setting is adjusted by turning a shade control knob 88 which, in this case is frictionally secured to the outer or knob end 90 of a flat, stamped metal, shade control shaft 92 journaled in the aperture 36 and the throughbore 43. A stamped metal, shade control cam element 94 is slidably mounted on the shade control shaft 92. For this purpose, cam element 94 has a rectangular slot 96 that slidable receives the shade control shaft 92 and that prevents relative rotation between the shaft 92 and the cam element 94. In addition, cam element 94 has an outwardly facing cam surface 98 adapted to bear against the latch plate 30 of FIG. 3. Shade control knob 88 is disposed on the knob end 90 of shaft 92 to enable one to turn the shade control cam element 94 in both clockwise and counterclockwise directions to adjust the toasting times.

The shade control shaft 92 of this invention has an inner end 100 that extends through the aperture 36 and has a pair of transversely extending projections 102 adjacent its inner end 100. The knob end 90 of the shaft 92 is dimensioned to be slidably received within the cam slot 96, the extreme outer end having ridges for cooperating with the conventional shaft connector within the adjusting knob 88.

A compression spring 104 is coiled around the shaft 92 and is confined between the outwardly facing surfaces of the transverse projections 102 and the inwardly facing surfaces of the cam element 94. Accordingly when the parts are assembled as shown in FIG. 4, the compression spring 104, which is placed under compression during assembly, presses outwardly on the cam element 94 maintaining it in engagement with the inwardly facing surface 48 of the adjusting nut 44. At the same time, the compression spring 104 presses inwardly on the transverse projections 102 forcing them into engagement with the inner plate 16 and ensuring that the inner end 100 of the shaft 92 projects into and through the aperture 36.

The shade control shaft 92 has an intermediate section 106 between its outer end 90 and the transverse projections 102 which is wider than the cam slot 96, whereby a pair of outwardly facing shoulders 108 are formed on the front end of the intermediate section 106. Shoulders 108 serve as stops which engage the inwardly facing surface of the cam element 94 to prevent dislocation of the control shaft 92 in the event that one should pull outwardly on the shaft 92 as, for example, when removing the knob 88. During normal operation, the shoulders 108 are spaced from the cam element 94 by a distance sufficient to permit adjustment of the position of the cam element 94 along the shaft 92 by rotation of the adjusting nut 44.

If one should pull outwardly on the shaft 92, the shoulders 108 will engage and stop against the inwardly facing surface of the cam element 96 and thereby restrict outward movement of the shaft 92 to a short distance. This prevents the shaft 92 from being pulled s far outwardly that the inner end 100 of the shaft 92 is pulled free from confinement by the aperture 36. Accordingly, the length of the inner end 100 of the shaft 92 that extends inwardly beyond the transverse projections 102 is sufficient to permit the restricted outward movement of the shaft 92 needed to provide a spacing between the shoulders 108 and the inwardly facing surface of the cam 94 for adjustment of the position of the cam 94 along the shaft 92.

Figure 1:
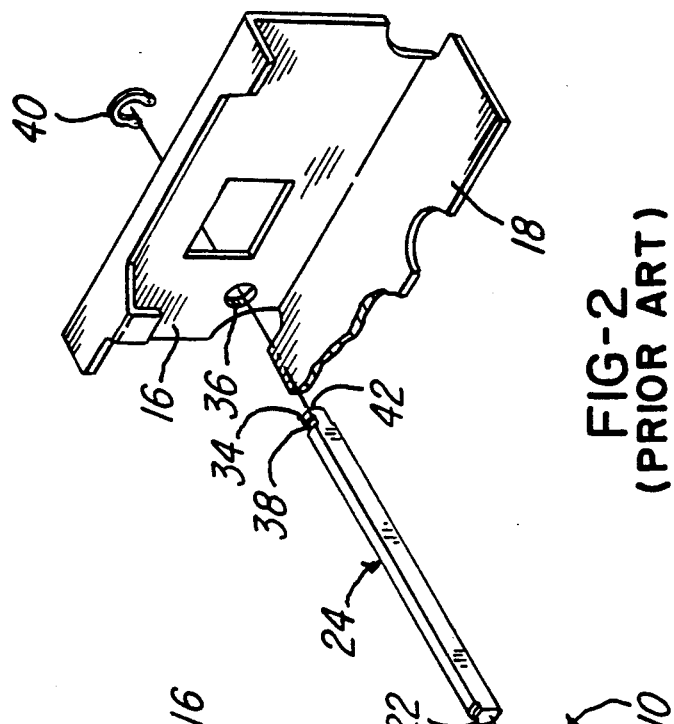
FIG. 1 is a partly exploded, perspective view of a prior art toast shade selector.
Figure 2:
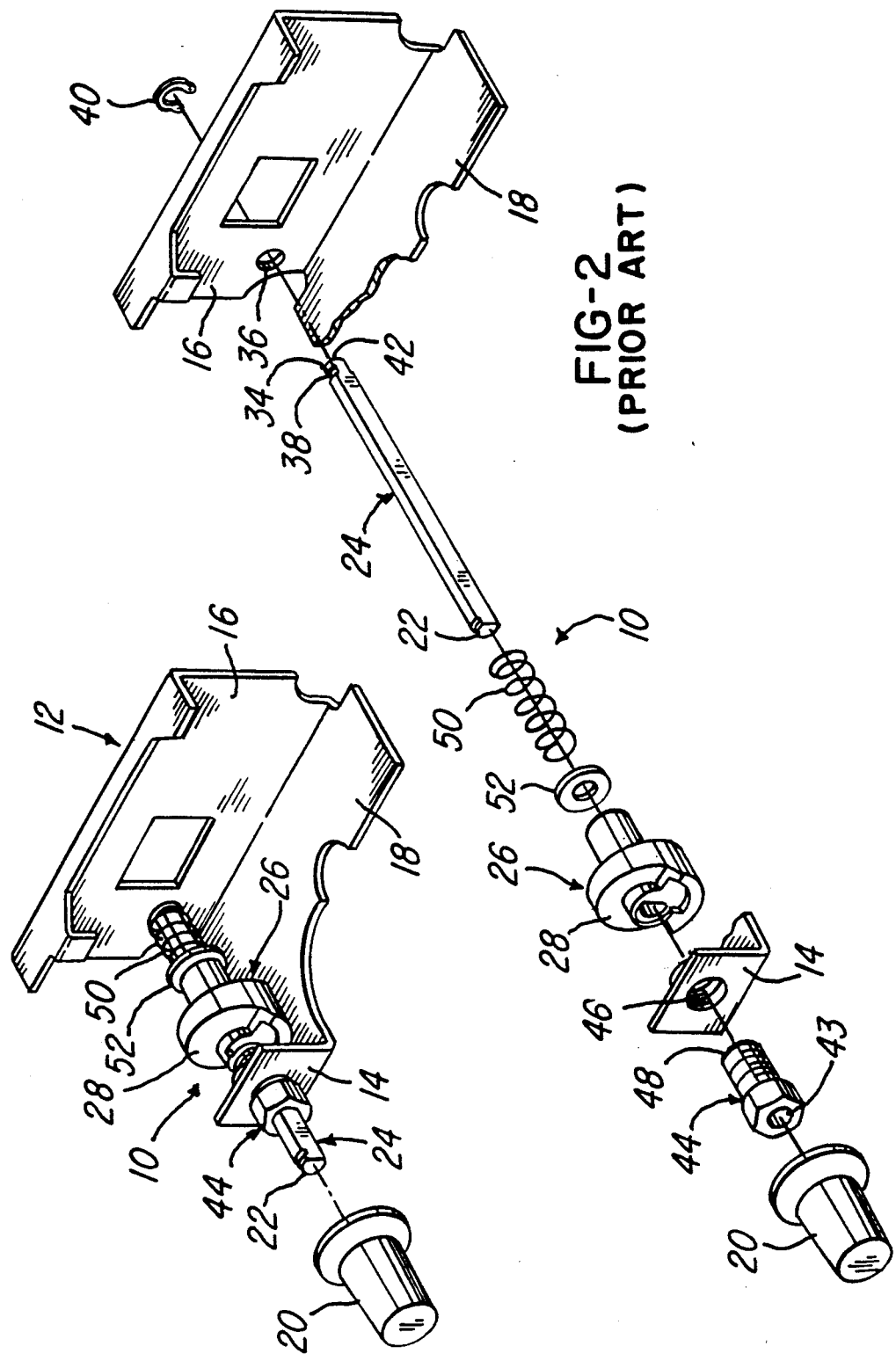
FIG. 2 is an exploded, perspective view, with parts broken away, of the prior art toast shade selector illustrated in FIG. 1.

The shade selector 62 of this invention is superior to the prior art shade selector partly because the shaft 92 and the cam element 94 can be inexpensively manufactured by metal stamping operations. Furthermore, the spring 104 of this invention simultaneously functions to bias cam element 94 against adjusting nut 44 and to press the transversely extending projections 102 against the plate 16 to ensure that the inner end 100 of the shaft 92 remains in aperture 36. In contrast, spring 50 of the prior art design illustrated in FIGS. 1 and 2 biased cam element 26 against the adjusting nut 44 but required the spring clip 40 to secure the D-shaft 24 to the plate 16. Moreover, the prior art construction required the washer 52 interposed between the spring 50 and the ca element 26. Thus, fewer elements are needed to construct the improved shade selector 62 of this invention than are needed for the prior art selector 10. In addition to the cost savings resulting from the need to purchase fewer parts, the assembly costs are also lowered since fewer parts are handled.

It is apparent that there has been provided in accordance with this invention a toast shade selector for use with a toasting time control that satisfies the objects and advantages set forth above. The new selector uses fewer parts, less expensive parts, and is easier to assemble.

Although the presently preferred embodiment of this invention has been described, it will be understood that within the purview of this invention various changes may be made within the scope of the following claims.

I claim:

1. A toast shade selector for use with a toasting appliance, said selector mechanism comprising:
   a bracket adapted to be secured to said toaster appliance, said bracket including first and second plates with first and second aligned openings, respectively, therethrough;
   a rotatable shaft with first and second opposite ends having transversely projecting portions adjacent the second end, said shaft interposed between said first and second plates with said first and second ends projecting through said first and second aligned openings, respectively;
   cam means slidably coupled to said rotatable shaft for rotation either in a clockwise or counter-clockwise direction whereby a toasting time interval of food items is adjusted;
   means extending through said first opening to position said cam means at a desired location intermediate said first and second opposite ends of said shaft; and
   spring means extending between said projecting portions and said cam means for biasing said cam means to said desired location and said projecting portions shoulder against said second plate.

2. The selector of claim 1 including a shoulder between said first and second ends of said shaft engageable with said cam means to prevent dislocation of said shaft by pulling said first end of said shaft in a direction away from said second plate.

3. The selector of claim 1 wherein said shaft includes a first elongated portion having a first width extending from said first end to a shoulder intermediate said first and second ends and a second elongated portion having a second width larger then said first width extending from said shoulder to the second opposite end.

4. The selector of claim 3 wherein said cam means is positioned at said desired location on said first elongated portion of said shaft intermediate said first end and said shoulder 5. The selector of claim 1 wherein said shaft is constructed of flat sheet metal.

6. The selector of claim 5 wherein said cam means is constructed of stamped sheet metal.

7. The selector of claim 6 wherein said spring means is a compression spring.

8. The selector of claim 3 wherein said means to position comprises an adjusting nut having a through-bore that receives said first elongated portion of said shaft.

9. A toast shade selector for use with a toasting appliance to adjust the toasting time interval for food items including bread slices, said toast shade selector comprising:
   a bracket adapted to be secured to said toaster appliance, said bracket including first and second mutually spaced, and parallel upstanding plates having first and second aligned openings, respectively, therethrough;

an elongated, flat rotatable shaft with first and second opposite ends, said shaft having transversely projecting portions adjacent said second of said ends, said shaft including a first elongated portion having a first width extending from said first end to a shoulder intermediate said first and second ends and a second elongated portion having a second width greater then said first width extending from said shoulder to the first opposite end, said shaft interposed between said first and second upstanding plates with said first and second ends projecting through said first and second aligned openings, respectively;

cam means slidably coupled to said rotatable shaft between said shoulder and said first of said opposite ends for rotation in either a clockwise or counterclockwise direction whereby said toasting time interval of said food items is adjusted;

means extending through said first opening to position said cam means at a desired location intermediate said first elongated portion; and a spring carried by said shaft in surrounding relation thereto, said spring extending between said shoulder and said cam means for biasing said cam means to said desired location and said projection against said second plate whereby said second end of said shaft is supported in said second opening.

10. The selector of claim 9 wherein said shoulder prevents removal of said second end of said shaft from said second opening if said first end of said shaft is pulled in the direction away from said second plate.

* * * * *